United States Patent Office 2,716,062
Patented Aug. 23, 1955

2,716,062

4-HYDROXY-6-ALKYL- 1,3,3a,7 - TETRAZAINDENE STABILIZERS FOR EMULSIONS SENSITIZED WITH ALKYLENE OXIDE POLYMERS

Burt H. Carroll and Norman F. Beach, Rochester, N. Y., assignors to Eastman Kodak Company, Rochester, N. Y., a corporation of New Jersey No Drawing. Application July 1, 1953,
Serial No. 365,550

20 Claims. (Cl. 95—7)

This invention relates to fog inhibiting agents and stabilizers for photographic emulsions and to photographic emulsions containing them.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, we are not concerned witth the latter.

Fog depends both on the emulsion and the conditions of developments; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

It is known that the effective sensitivity of photographic silver halide emulsions may be increased by adding to them derivatives of alkylene oxides such as ethylene oxide polymers having molecular weights of 300 or more. The practical value of these compounds is severely limited by their tendency to increase fog on storage of the photographic film, especially storage at elevated temperatures and humidities. It has been found difficult to control this by the antifoggants commonly available without using quantities of antifoggant which partly neutralize the speed increase obtained from the alkylene oxide derivatives.

It is therefore an object of the present invention to provide a method for stabilizing photographic emulsions sensitized with alkylene oxide derivatives such as polyethylene oxides. A further object is to provide a means for reducing the fog produced upon keeping of emulsions so sensitized, especially emulsions stored under tropical or other adverse conditions. A still further object is to provide a means for stabilizing the speed and contrast of emulsions so sensitized. Other objects will appear from the following description of our invention.

These objects are accomplished in general by adding to the emulsion sensitized with alkylene oxide polymers, one or more 4-hydroxy-6-alkyl-1,3,3a,7-tetrazaindenes as stabilizing and fog inhibiting agents.

The alkylene oxide polymers used to sensitize the emulsions may be of various types. The alkylene oxides from which the polymers are derived contain from 2 to 4 carbon atoms, e. g., ethylene oxide, propylene oxide and butylene oxide. The preparation of polymers from these compounds is described in Ellis, The Chemistry of Synthetic Resins (1935), pages 990 to 994. These compounds are also referred to as polyalkylene glycols and their use as sensitizers for silver halide emulsions is described in U. S. Patents 2,423,549 and 2,441,389.

Various derivatives of alkylene oxides may also be used to sensitize the silver halide emulsions, e. g., condensation products of alkylene oxide with glycols, such as those having from 8 to 18 carbon atoms as described in U. S. Patent 2,240,472 and British Patent 443,559, as well as condensation products of alkylene oxides with aliphatic alcohols, aliphatic acids and aliphatic amines, and with phenols, that is, polyalkylene ethers, esters and amides, the preparation of which is described in U. S. Patent 1,970,578, and condensation products of alkylene oxides with hexitol ring dehydration products, as described in U. S. Patent 2,400,532.

In each case the polyalkylene oxide or derivative of alkylene oxide should have a molecular weight of at least 300 and preferably a molecular weight of 1500 to 4000 or more.

The tetrazaindene stabilizing agents which we propose to use have the following structure:

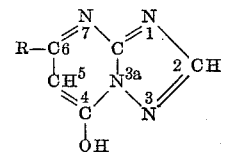

in which R is an alkyl group, e. g., methyl, ethyl, propyl, butyl, etc.

A specific example of this class of compounds is the following:

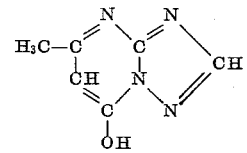

4-hydroxy-6-methyl-1,3,3a,7-tetrazaindene

The principal purpose of our invention is to provide a means for maintaining the sensitivity and fog of silver halide emulsions at or close to initial optimum values under conditions of high temperature or humidity or both. Preferably the fog inhibitors which we propose to use are added to the emulsion at any stage during the process of manufacture prior to coating the emulsion. The tetrazaindene fog inhibitor may be added to the emulsion in solution in any convenient solvent not injurious to the emulsion such as lower alcohols or ketones.

A solution of the tetrazaindene which we employ when added in suitable concentration before coating to unsensitized or optically sensitized silver halide emulsions usually does not appreciably affect the sensitivity and fog when measurements are made soon after coating. However, when sensitometric measurements are made after appreciable intervals of time under tropical or dry conditions of storage at elevated temperatures, these compounds do stabilize speed and maintain fog at a low level.

The alkylene oxide derivatives used to sensitize the emulsions may be illustrated by the following specific examples, although our invention is in no way limited to the use of these specific compounds.

$$HOCH_2CH_2O(CH_2CH_2O)_nCH_2CH_2OH$$

Polyethylene oxide

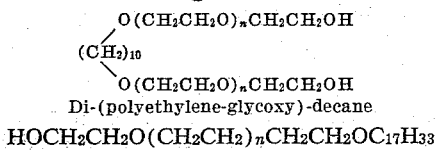

Di-(polyethylene-glycoxy)-decane $HOCH_2CH_2O(CH_2CH_2)_nCH_2CH_2OC_{17}H_{33}$

Polyethylene oxide oleyl ether where $n=$ an integer greater than about 10.

The preparation of silver halide emulsions involves three separate operations: (1) the emulsification and digestion or ripening of the silver halide, (2) the freeing of the emulsion from aqueous soluble salts usually by washing, (3) the second digestion or after-ripening to obtain increased sensitivity (Mees, The Theory of the Photographic Process, 1942, page 3). The fog inhibiting agents may be added at any stage, preferably after the final digestion.

The photographic emulsions which we use are of the developing-out type and best results have been obtained with gelatino-silver bromoiodide emulsions. However, emulsions of varying halide content may be used.

The emulsions may be chemically sensitized by any of the accepted procedures, in addition to or in combination with the sensitizing with alkylene oxide polymers. The emulsions may be digested with naturally active gelatin, or sulfur compounds may be added such as those described in Sheppard, U. S. Patents 1,574,944 and 1,623,499, and Sheppard and Brigham, U. S. Patent 2,410,689.

The emulsions may also be treated with salts of the noble metals such as ruthenium, rhodium, palladium, iridium and platinum, all of which belong to group VIII of the periodic table of elements and have an atomic weight greater than 100. Representative compounds are ammonium chloropalladate, potassium chloroplatinate and sodium chloropalladite, which are used for sensitizing in amounts below that which produces any substantial fog inhibition, as described in Smith and Trivelli, U. S. Patent 2,448,060, and as antifoggants in higher amounts, as described in Trivelli and Smith, U. S. Patents 2,566,245 and 2,566,263.

The emulsions may also be chemically sensitized with gold salts as described in Waller and Dodd, U. S. Patent 2,399,083, or stabilized with gold salts as described in Damschroder, U. S. Patent 2,597,856, and Yutzy and Leermakers, U. S. Patent 2,597,915. Suitable compounds are potassium chloroaurite, potassium aurithiocyanate, potassium chloraurate, auric trichloride and 2-aurosulfobenzothiazole methochloride.

The emulsions may also be chemically sensitized with reducing agents such as stannous salts (Carroll, U. S. Patent 2,487,850), polyamines such as diethylene triamine (Lowe and Jones, U. S. Patent 2,518,698), polyamines such as spermine (Lowe and Allen, U. S. Patent 2,521,925), or bis-($\beta$-aminoethyl) sulfide and its water-soluble salts (Lowe and Jones, U. S. Patent 2,521,926).

The emulsions may also be stabilized with the mercury compounds of Allen, Byers and Murray U. S. application Serial No. 319,611, Carroll and Murray U. S. application Serial No. 319,612 and Leubner and Murray U. S. application Serial No. 319,613, all filed November 8, 1952.

The sensitizing and stabilizing combinations of polyalkylene oxides and tetrazaindenes are effective in the presence or absence of optical sensitizing dyes. Since optical sensitizing may affect stability of emulsions with respect to sensitivity, fog and latent image changes, the action of the compounds of this invention is not completely independent of optical sensitizing or other emulsion variables. We have found, however, that both unsensitized emulsions and emulsions sensitized with cyanine or merocyanine dyes or both may be treated with polyalkylene oxides and tetrazaindenes according to our invention.

The most useful concentration of the tetrazaindene compound in the emulsion is from about 0.1 gram to 2 grams per gram mole of silver halide in the emulsion. Although higher amounts may be used, no emulsion is likely to tolerate as much as 5 times this upper limit without serious desensitization. Optimum concentrations are about 1.0 gram of the tetrazaindene per gram mole of silver halide. These amounts may be used in combination with one or more of the chemical sensitizing and stabilizing agents listed above.

The stabilizing action was determined by incubation of the emulsions usually for one or two weeks at 120° F. and constant humidity unless otherwise stated in the examples. The results of aging tests are tabulated below and compare speed, gamma and fog of the emulsions with and without the stabilizing compound.

*Example 1*

One liter of a high-speed gelatino-silver bromoiodide emulsion containing 0.24 mole of silver halide per liter was digested with a sulfur compound such as disclosed in Sheppard, U. S. Patent 1,574,944, and potassium chloroaurate and optically sensitized with 3,3'-diethyl-9-methylthiacarbocyanine. To a portion of the emulsion there was added 0.45 gram per gram mole of silver halide of the condensation product of one mole of cetyl alcohol with approximately 15 moles of ethylene oxide, and to a second portion of the emulsion there was added 0.06 gram per gram mole of silver halide of 4-hydroxy-6-methyl-1,3,3a,7-tetrazaindene. Portions of the emulsions containing the addenda were also mixed to obtain an emulsion containing both the cetyl alcohol-ethylene oxide condensation product and the tetrazaindene.

The emulsions were coated on film base and were exposed on an Eastman type Ib Sensitometer and developed for 3 minutes at 68° F. in a developer of the following formula:

| | Grams |
|---|---|
| N-methyl-p-aminophenol sulfate | 2.2 |
| Hydroquinone | 8.8 |
| Sodium sulfite (desiccated) | 96 |
| Sodium carbonate (desiccated) | 48 |
| Potassium bromide | 5 |
| Water to 1 liter. | |

The films with and without the various addenda were held at 120° F. and constant humidity for two weeks and were then exposed and developed as indicated. The results of tests for speed, gamma and fog before and after incubation of each of the samples were as follows:

| Compound | Agent per mole, g. | Fresh Test | | | After Incubation | | |
|---|---|---|---|---|---|---|---|
| | | Speed | Gamma | Fog | Speed | Gamma | Fog |
| Control | | 2,400 | 1.05 | .16 | 1,300 | .88 | .27 |
| Polyethylene glycol cetyl ether (I) | 0.45 | 4,500 | .92 | .16 | 1,850 | .81 | .33 |
| 4-Hydroxy-6-methyl-1,3,3a,7-tetrazaindene (II) | 0.60 | 3,300 | .97 | .15 | 2,250 | .90 | .20 |
| {I | .45 | } 4,400 | .95 | .17 | 3,300 | .82 | .22 |
| {II | .60 | | | | | | |

Example 2

This example illustrates the advantage of using the tetrazaindene stabilizer with an emulsion sensitized with the alkylene oxide polymer and stabilized with a water-insoluble gold compound (Yutzy and Leermakers, U. S. Patent 2,597,915).

One liter of a negative-speed gelatino-silver bromoiodide emulsion containing 0.24 mole of silver halide per liter was digested with a sulfur compound and a gold salt as in Example 1 and was panchromatically sensitized. To a portion of the emulsion there was added 0.44 gram per gram mole of silver halide of the condensation product of one mole of oleyl alcohol with approximately 25 moles of ethylene oxide (polyethylene glycol oleyl ether). To a portion of this emulsion sensitized with the ethylene oxide polymer there was added 0.9 gram per gram mole of silver halide of 4-hydroxy-6-methyl-1,3,3$a$,7-tetrazaindene. To a second portion of the emulsion sensitized with the ethylene oxide polymer there were added 0.9 gram per gram mole of silver halide of the tetrazaindene and .0025 gram per gram mole of silver halide of $Au_2S$.

The emulsions were coated on film base and were exposed on an Eastman type Ib Sensitometer and developed for 9 minutes at 68° F. in a developer of the following formula:

| | Grams |
|---|---|
| N-methyl-p-aminophenol sulfate | 1.5 |
| Hydroquinone | 1.3 |
| Sodium sulfite (desiccated) | 75 |
| Borax | 4.5 |
| Potassium bromide | .4 |
| Water to 1 liter. | |

Portions of the unexposed films with and without the various addenda were held at 120° F. and constant humidity for one week and were then exposed and developed as indicated. The results of tests for speed, gamma and fog before and after incubation of each of the samples, speed being read as 30/E, were as follows:

| Compound | Agent per mole, g. | Fresh Test | | | After Incubation | | |
|---|---|---|---|---|---|---|---|
| | | Speed | Gamma | Fog | Speed | Gamma | Fog |
| Control | | 5,850 | .77 | .03 | 2,950 | .66 | .16 |
| Polyethylene glycol oleyl ether (I) | .44 | 7,050 | .75 | .04 | 1,950 | .54 | .49 |
| I | .44 | 8,850 | .78 | .04 | 5,350 | .62 | .16 |
| 4-Hydroxy-6-methyl-1,3,3a,7-tetrazaindene (II) | .9 | | | | | | |
| I | .44 | 7,900 | .77 | .05 | 7,200 | .70 | .14 |
| II | .9 | | | | | | |
| $Au_2S$ | .0025 | | | | | | |

It is apparent from the data in the table that the speed, after incubation, of the emulsion containing both the tetrazaindene and $Au_2S$ is higher than the speed of the emulsion containing the tetrazaindene alone and that the fog is about the same or slightly lower.

Example 3

This example illustrates the advantage of using the tetrazaindene stabilizer in combination with a chloropalladate (Trivelli and Smith U. S. Patent 2,566,245).

A negative-speed gelatino-silver bromoiodide emulsion was chemically sensitized with sulfur and gold sensitizers and panchromatically sensitized as in Example 2, and to a portion of the emulsion there was added 0.44 gram per gram mole of silver halide of the ethylene oxide polymer as in Example 2. To one portion of this emulsion there was added 0.9 gram per gram mole of silver halide of 4-hydroxy-6-methyl-1,3,3$a$,7-tetrazaindene and to a second portion of the emulsion sensitized with the ethylene oxide polymer there was added both the tetrazaindene and 0.044 gram per gram mole of silver halide of ammonium chloropalladate.

The emulsions were coated on film base and were exposed and developed as in Example 2. Portions of the unexposed films with and without the various addenda were incubated as in Example 2 and were then exposed and developed in the same manner. The results of tests for speed, gamma and fog before and after incubation were as follows:

| Compound | Agent per mole, g. | Fresh Test | | | After Incubation | | |
|---|---|---|---|---|---|---|---|
| | | Speed | Gamma | Fog | Speed | Gamma | Fog |
| Control | | 5,850 | .77 | .03 | 2,950 | .66 | .16 |
| Polyethylene glycol oleyl ether (I) | .44 | 7,050 | .75 | .04 | 1,950 | .54 | .49 |
| I | .44 | 8,850 | .78 | .04 | 5,350 | .62 | .16 |
| 4-Hydroxy-6-methyl-1,3,3a,7-tetrazaindene (II) | .9 | | | | | | |
| I | .44 | 7,700 | .78 | .08 | 7,350 | .65 | .18 |
| II | .9 | | | | | | |
| Ammonium chloropalladate | .044 | | | | | | |

The table shows that the incubated emulsion containing both the tetrazaindene and the chloropalladate (in addition to the polyethylene glycol oleyl ether) had, after incubation, a higher speed and about the same degree of fog as the emulsion containing the tetrazaindene alone. Both speeds are considerably higher and fog much less than the emulsion sensitized with the ethylene oxide polymer but without stabilizer.

Example 4

This example illustrates the advantage of using the tetrazaindene stabilizer in combination with a mercuric compound of the type disclosed in Allen, Byers and Murray, U. S. application Serial No. 319,611.

A negative-speed gelatino-silver bromoiodide emulsion was chemically sensitized with sulfur and gold sensitizers and panchromatically sensitized as in Example 2. To a portion of this emulsion there was added 0.6 gram per gram mole of silver halide of the ethylene oxide polymer used in Example 1. To one portion of this emulsion containing the ethylene oxide polymer there was added one gram per gram mole of silver halide of 4-hydroxy-6-methyl-1,3,3$a$,7-tetrazaindene and to a second portion of the emulsion containing the ethylene oxide polymer there was added both the tetrazaindene and 0.5 milligram per gram mole of silver halide of bis-(2-amino-5-iodopyridine hydriodide) mercuric iodide.

The emulsions were coated on film base and were exposed on an Eastman type I$b$ Sensitometer and developed for five minutes at 68° F. in a developer of the following formula:

| | Grams |
|---|---|
| N-methyl-p-aminophenol sulfate | 2.5 |
| Hydroquinone | 2.5 |
| Sodium sulfite (desiccated) | 30 |
| Sodium metaborate | 10 |
| Potassium bromide | .5 |
| Water to 1 liter. | |

Portions of the unexposed films with and without the various addenda were held at 120° F. and 60% relative humidity for two weeks and were then exposed and developed as indicated. The results of tests for speed, gamma and fog, speed being read as ASA speeds, were as follows:

| Compound | Agent per mole, g. | Fresh Test | | | After Incubation | | |
|---|---|---|---|---|---|---|---|
| | | Speed | Gamma | Fog | Speed | Gamma | Fog |
| Control | | 530 | .84 | .04 | 210 | .68 | .32 |
| Polyethylene glycol cetyl ether (I) | .6 | 690 | .77 | .05 | 115 | .52 | .90 |
| I | .6 | 780 | .75 | .05 | 630 | .68 | .17 |
| 4-Hydroxy-6-methyl-1,3,3a,7-tetrazaindene (II) | 1 | | | | | | |
| I | .6 | 730 | .74 | .05 | 690 | .71 | .80 |
| II | 1 | | | | | | |
| Bis-(2-amino-5-iodopyridine hydriodide) mercuric iodide | .5 | | | | | | |

The compounds of our invention may be prepared by heating ethyl acetoacetate or its homologues with 3-amino-1,2,4-triazole. (Ber. 42, part 4, page 4642, 1909; Zeitschrift für wissenschaftliche Photographie, 47, part 1–3, page 6, 1952). While we believe that this reaction produces compounds having the general formula expressed above, we include within the scope of our invention any isomeric or tautomeric forms of the compounds which may be produced by this reaction and which are effective fog-inhibiting or stabilizing agents for photographic emulsions.

Instead of incorporation in the silver halide emulsion the fog-inhibitors of our invention may be incorporated in a colloid layer such as a gelatin layer in contact with the emulsion.

The fog-inhibiting agents which we have described may be used in various kinds of photographic emulsions. In addition to being useful in non-sensitized emulsions they may also be used in orthochromatic, panchromatic and X-ray emulsions. If used with sensitizing dyes, they may be added to the emulsion before or after the dyes are added. Various silver salts may be used as the sensitive salt, such as silver bromide, silver iodide, silver chloride or mixed silver halides. The azaindene compounds and alkylene oxide polymers may be used in emulsions intended for color photography, for example, emulsions containing color-forming couplers, or emulsions to be developed by solutions containing couplers.

The dispersing agents may be gelatin or other colloid such as collodion, albumen, cellulose derivatives or synthetic resins.

It will be understood that we contemplate as included within our invention all modifications and equivalents falling within the scope of the appended claims.

We claim:
1. A light-sensitive silver halide emulsion sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines and (4) condensation products of alkylene oxide with hexitol ring dehydration products, said alkylene oxide containing from 2 to 4 carbon atoms and said alkylene oxide polymer having a molecular weight of at least 300, said emulsion containing as a fog inhibiting agent an azaindene having the formula:

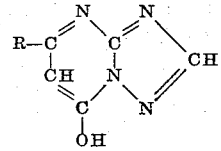

where R represents an alkyl group.

2. A light-sensitive silver halide emulsion sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines and (4) condensation products of alkylene oxide with hexitol ring dehydration products, said alkylene oxide containing from 2 to 4 carbon atoms and said alkylene oxide polymer having a molecular weight of at least 300, said emulsion containing as a fog inhibiting agent 4-hydroxy-6-methyl-1,3,3a,7-tetrazaindene.

3. A light-sensitive silver halide emulsion sensitized with an ethylene oxide polymer having a molecular weight of at least 300, said emulsion containing as a fog inhibiting agent a 4-hydroxy-6-alkyl-1,3,3a,7-tetrazaindene.

4. A light-sensitive silver halide emulsion sensitized with an ethylene oxide polymer having a molecular weight of at least 300, said emulsion containing as a fog inhibiting agent 4-hydroxy-6-methyl-1,3,3a,7-tetrazaindene.

5. A light-sensitive silver halide emulsion sensitized with a condensation product of one mole of cetyl alcohol with approximately 15 moles of ethylene oxide, said emulsion containing as a fog inhibiting agent 4-hydroxy-6-methyl-1,3,3a,7-tetrazaindene.

6. A light-sensitive sulfur-sensitized silver halide emulsion additionally sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines and (4) condensation products of alkylene oxide with hexitol ring dehydration products, said alkylene oxide containing from 2 to 4 carbon atoms and said alkylene oxide polymer having a molecular weight of at least 300, said emulsion containing as a fog inhibiting agent an azaindene having the formula:

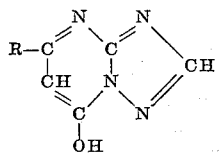

where R represents an alkyl group.

7. A light-sensitive sulfur-sensitized silver halide emulsion sensitized with an ethylene oxide polymer having a molecular weight of at least 300, said emulsion containing as a fog inhibiting agent a 4-hydroxy-6-alkyl-1,3,3a,7-tetrazaindene.

8. A light-sensitive sulfur-sensitized silver halide emulsion sensitized with a condensation product of one mole of cetyl alcohol with approximately 15 moles of ethylene oxide, said emulsion containing as a fog inhibiting agent 4-hydroxy-6-methyl-1,3,3a,7-tetrazaindene.

9. The emulsion of claim 6 which is additionally chemically sensitized with gold salts.

10. The emulsion of claim 8 which is additionally chemically sensitized with gold salts.

11. The emulsion of claim 1 which is additionally chemically sensitized with reduction sensitizers.

12. The emulsion of claim 6 which is additionally chemically sensitized with reduction sensitizers.

13. The emulsion of claim 8 which is additionally chemically sensitized with reduction sensitizers.

14. The emulsion of claim 6 which is additionally chemically sensitized with gold salts and reduction sensitizers.

15. The emulsion of claim 8 which is additionally chemically sensitized with gold salts and reduction sensitizers.

16. The emulsion of claim 8 which is additionally chemically sensitized with gold salts and stabilized with a salt of the general formula selected from the group consisting of $R_2MX_6$, $R_2M'X_4$ and $R_3M''X_6$, where R is selected from the group consisting of hydrogen, an alkali metal and ammonium, M is a metal selected from the group consisting of platinum, palladium, iridium, rhodium and ruthenium, M' is a metal selected from the group consisting of platinum and palladium, and M'' is a metal selected from the group consisting of iridium and rhodium, and X is a halogen atom.

17. The emulsion of claim 8 which is additionally chemically sensitized with gold salts and stabilized with a salt having the structure $R_2PdCl_6$ where R is selected from the group consisting of alkali metal and ammonium.

18. The emulsion of claim 8 which is additionally chemically sensitized with gold salts and stabilized with mercury salts.

19. The emulsion of claim 8 which is additionally chemically sensitized with water-soluble gold salts and stabilized with water-insoluble gold salts.

20. The emulsion of claim 8 which is additionally stabilized with mercury salts.

References Cited in the file of this patent

UNITED STATES PATENTS

| | | |
|---|---|---|
| 2,240,472 | Swan | Apr. 29, 1941 |
| 2,449,225 | Heimbach et al. | Sept. 14, 1948 |
| 2,450,397 | Heimbach | Sept. 28, 1948 |